United States Patent
Matsumura

(10) Patent No.: US 11,316,461 B2
(45) Date of Patent: Apr. 26, 2022

(54) MOTOR CONTROL APPARATUS, MOTOR CONTROL METHOD, AND MOTOR CONTROL SYSTEM

(71) Applicant: KABUSHIKI KAISHA YASKAWA DENKI, Kitakyushu (JP)

(72) Inventor: Isamu Matsumura, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 0 days.

(21) Appl. No.: 16/587,059

(22) Filed: Sep. 30, 2019

(65) Prior Publication Data

US 2020/0028461 A1 Jan. 23, 2020

Related U.S. Application Data

(63) Continuation of application No. PCT/JP2017/013818, filed on Mar. 31, 2017.

(51) Int. Cl.
*H02P 23/00* (2016.01)
*G05B 19/048* (2006.01)

(52) U.S. Cl.
CPC ........ *H02P 23/0077* (2013.01); *G05B 19/048* (2013.01); *G05B 2219/24015* (2013.01)

(58) Field of Classification Search
CPC .......................... H02P 23/0077; G05B 19/048
See application file for complete search history.

(56) References Cited

U.S. PATENT DOCUMENTS

| | | |
|---|---|---|
| 7,652,444 B2 | 1/2010 | Kessler et al. |
| 9,874,866 B2 | 1/2018 | Tanaka |
| 2004/0207357 A1* | 10/2004 | Aoyama ............... G05B 19/414 318/625 |
| 2008/0017245 A1* | 1/2008 | Kessler ................. G05B 15/02 137/2 |
| 2011/0169441 A1* | 7/2011 | Yoshiura ............ G05B 19/4141 318/625 |

(Continued)

FOREIGN PATENT DOCUMENTS

| | | |
|---|---|---|
| EP | 1460503 | 9/2004 |
| JP | 07-114402 | 5/1995 |
| JP | 08-241111 | 9/1996 |

(Continued)

OTHER PUBLICATIONS

International Search Report for corresponding International Application No. PCT/JP2017/013818, dated Jun. 20, 2017.

(Continued)

*Primary Examiner* — Kawing Chan
*Assistant Examiner* — Bradley R Brown
(74) *Attorney, Agent, or Firm* — Mori & Ward, LLP

(57) ABSTRACT

A motor control apparatus (2) according to the present disclosure is configured to control motors (#1-#3), automatically acquire identification information of a plurality of encoders (#1-#5), the encoders (#1-#5) being configured to be connected in series under a control of the motor control apparatus (2) and to detect position information of the motors (#1-#3) or position information of a mechanical apparatus configured to be driven by the motors (#1-#3), and store the identification information and the motor control unit in a non-volatile memory (11) in association with each other.

12 Claims, 5 Drawing Sheets

(56) References Cited

U.S. PATENT DOCUMENTS

2016/0011580 A1* 1/2016 Tanaka .................. G05B 19/19

FOREIGN PATENT DOCUMENTS

| JP | 10-105206 | 4/1998 |
| JP | 2001-157458 | 6/2001 |
| JP | 2006-260581 | 9/2006 |
| JP | 2007-528070 | 10/2007 |
| JP | 2016-18445 | 2/2016 |

OTHER PUBLICATIONS

Japanese Office Action for corresponding JP Application No. 2017-534618, dated Oct. 10, 2017 (w/ English machine translation).
Extended European Search Report for corresponding EP Application No. 17903987.0-1202, dated Oct. 8, 2020.

* cited by examiner

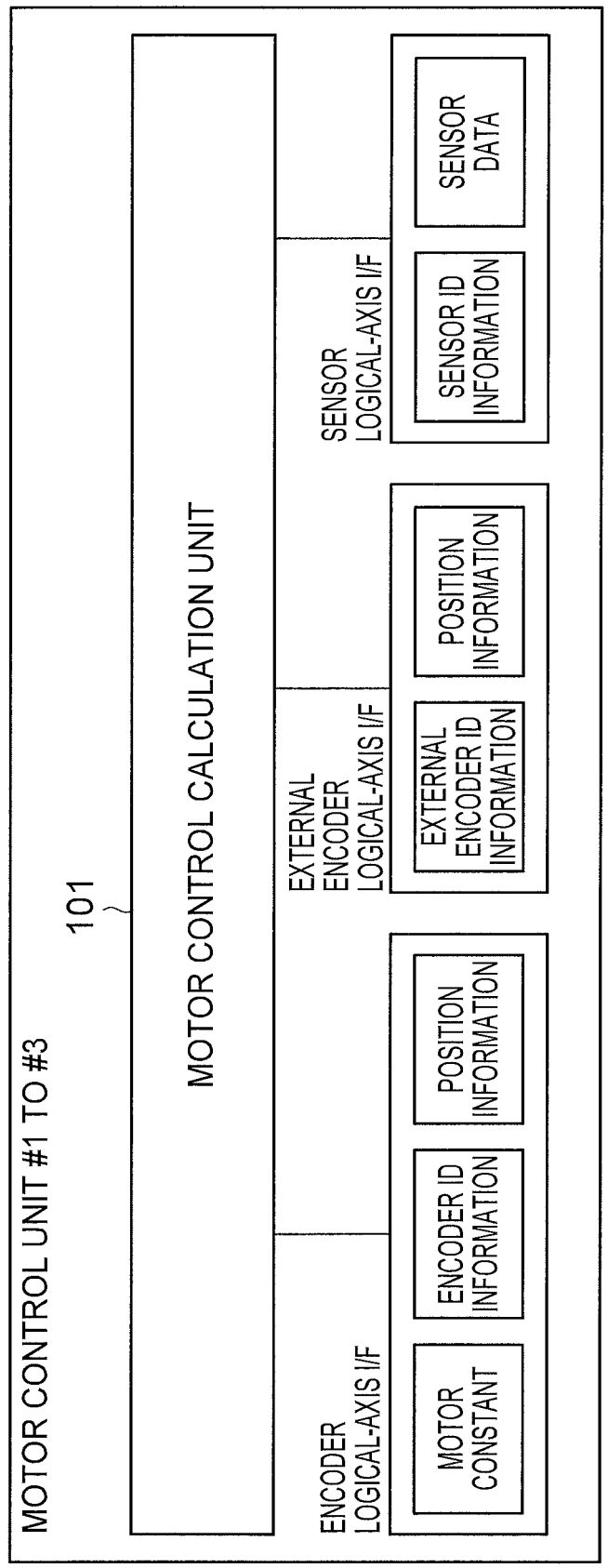

FIG. 4

|  |  | PHYSICAL IF | COMMUNICATION ADDRESS | ID INFORMATION |
|---|---|---|---|---|
| FIRST AXIS | MOTOR CONTROL UNIT #1 ENCODER LOGICAL-AXIS I/F | ch3 | Addr.3 | ENCODER #1 ID |
|  | MOTOR CONTROL UNIT #1 EXTERNAL ENCODER LOGICAL-AXIS I/F | - | - | - |
|  | MOTOR CONTROL UNIT #1 SENSOR LOGICAL-AXIS I/F | ch1 | Addr.3 | SENSOR #6 ID |
| SECOND AXIS | MOTOR CONTROL UNIT #2 ENCODER LOGICAL-AXIS I/F | ch3 | Addr.2 | ENCODER #2 ID |
|  | MOTOR CONTROL UNIT #2 EXTERNAL ENCODER LOGICAL-AXIS I/F | ch2 | Addr.2 | EXTERNAL ENCODER #4 ID |
|  | MOTOR CONTROL UNIT #2 SENSOR LOGICAL-AXIS I/F | ch1 | Addr.2 | SENSOR #7 ID |
| THIRD AXIS | MOTOR CONTROL UNIT #3 ENCODER LOGICAL-AXIS I/F | ch3 | Addr.1 | ENCODER #3 ID |
|  | MOTOR CONTROL UNIT #3 EXTERNAL ENCODER LOGICAL-AXIS I/F | ch2 | Addr.1 | EXTERNAL ENCODER #5 ID |
|  | MOTOR CONTROL UNIT #3 SENSOR LOGICAL-AXIS I/F | ch1 | Addr.1 | SENSOR #8 ID |

MOTOR CONTROL APPARATUS, MOTOR CONTROL METHOD, AND MOTOR CONTROL SYSTEM

TECHNICAL FIELD

The present disclosure relates to a motor control apparatus, a motor control method, and a motor control system.

BACKGROUND ART

Patent Literature 1 discloses a system in which a plurality of sensors are connected to an interface unit through respective communication paths, and a detection signal of each of the sensors is transmitted to a host controller or a motor control apparatus via a network that connects the host controller and the motor control apparatus to each other.

Patent Literature 2 discloses a system in which a peripheral device that sets a parameter of a motor control apparatus or performs monitoring of the motor control apparatus through a communication unit in the motor control apparatus is connected.

CITATION LIST

Patent Literature

Patent Literature 1: JP H8-241111 A
Patent Literature 2: JP H10-105206 A

SUMMARY OF INVENTION

Technical Problem

However, there is a problem in that each sensor or each peripheral device is connected to a motor control apparatus, and thus a physical or processing cost tends to increase, in the system in the related art.

The present disclosure has been made in consideration of the above circumstances, and an object of the present disclosure is to provide a motor control apparatus, a motor control method, and a motor control system, in which it is possible to reduce a physical or processing cost.

Solution to Problem

The first aspect of the present disclosure is summarized as a motor control apparatus including: a motor control unit configured to control a motor, wherein the motor control apparatus is configured: to automatically acquire identification information of a plurality of position detectors, the position detectors being configured to be connected in series under a control of the motor control apparatus and to detect position information of the motor or position information of a mechanical apparatus configured to be driven by the motor, and to store the identification information and the motor control unit in a non-volatile memory in association with each other.

The second aspect of the present disclosure is summarized as a motor control apparatus including: a motor control unit configured to control a motor, wherein the motor control apparatus is configured: to automatically acquire identification information of a position detector and a sensor connected in series under a control of the motor control apparatus, and to store the identification information and the motor control unit in a non-volatile memory in association with each other, the position detector is configured to detect position information of the motor or position information of a mechanical apparatus configured to be driven by the motor, and the sensor is configured to detect information relating to at least one of the motor and the mechanical apparatus configured to be driven by the motor.

The third aspect of the present disclosure is summarized as a motor control method of controlling a motor, the method including: automatically acquiring identification information of a plurality of position detectors configured to be connected in series under a control of a motor control apparatus and to detect position information of the motor or position information of a mechanical apparatus configured to be driven by the motor, by the motor control apparatus; and storing the acquired identification information and the motor in a non-volatile memory in association with each other by the motor control apparatus.

The fourth aspect of the present disclosure is summarized as a motor control method of controlling a motor, the method including: automatically acquiring identification information of a position detector configured to be connected in series under a control of a motor control apparatus and to detect position information of the motor or position information of a mechanical apparatus configured to be driven by the motor and automatically acquiring identification information of a sensor configured to be connected in series under the control of the motor control apparatus and to detect information relating to at least one of the mechanical apparatus and the motor, by the motor control apparatus; and storing the acquired identification information and the motor in a non-volatile memory in association with each other, by the motor control apparatus.

The fifth aspect of the present disclosure is summarized as a motor control system including: a motor control apparatus including a motor control unit configured to control a motor; and a plurality of position detectors configured to be connected in series under a control of the motor control apparatus and to detect position information of the motor or position information of a mechanical apparatus configured to be driven by the motor, wherein the motor control apparatus is configured to automatically acquire identification information of the plurality of position detectors and to store the identification information and the motor control unit in the non-volatile memory in association with each other.

The sixth aspect of the present disclosure is summarized as a motor control system including: a motor control apparatus including a motor control unit configured to control a motor; a mechanical apparatus configured to be driven by the motor; a position detector configured to detect position information of the motor or position information of the mechanical apparatus; and a sensor configured to detect information relating to at least one of the mechanical apparatus and the motor, wherein the motor control apparatus is configured: to automatically acquire identification information of the position detector and identification information of the sensor, the position detector and the sensor being connected in series under a control of the motor control apparatus, and to store the identification information and the motor control unit in a non-volatile memory in association with each other.

Advantageous Effects of Invention

According to the present disclosure, it is possible to provide a motor control apparatus, a motor control method, and a motor control system, in which it is possible to reduce a physical or processing cost.

BRIEF DESCRIPTION OF DRAWINGS

FIG. 3 is a diagram illustrating an example of a function block of a motor control unit in a motor control apparatus constituting the motor control system according to the embodiment.

FIG. 4 is a diagram illustrating an example of a mapping table managed by an encoder-sensor communication transmission-and-reception management unit of the motor control apparatus constituting the motor control system according to the embodiment.

DESCRIPTION OF EMBODIMENTS

According to the viewpoint of the inventor of the present invention, sensing of an operation situation in a motor control system has become more important in recent years. However, if the number of sensors increases, a physical cost for the number of wires and the like and a processing cost for traffic, processing loads, and the like increase. In particular, in a case where sensing is performed in real time, the costs tend to increase.

As a result of intensive research and development to reduce the costs in the motor control system, the inventor of the present invention has conceived of a new and unique motor control system. Hereinafter, an example of a motor control system 1 according to an embodiment will be described with reference to FIGS. 1 to 6.

Figure 1:
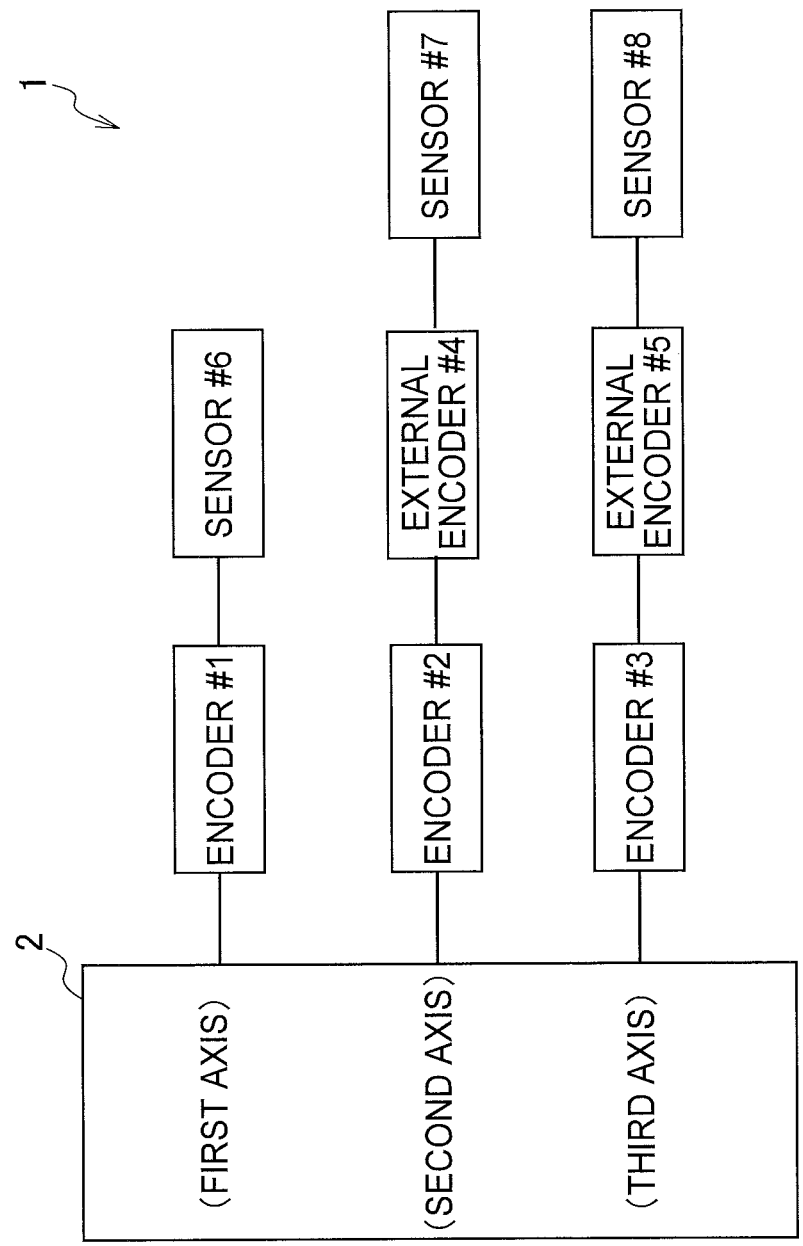
FIG. 1 is a diagram illustrating an example of a hardware configuration of a motor control system according to an embodiment.
Figure 2:
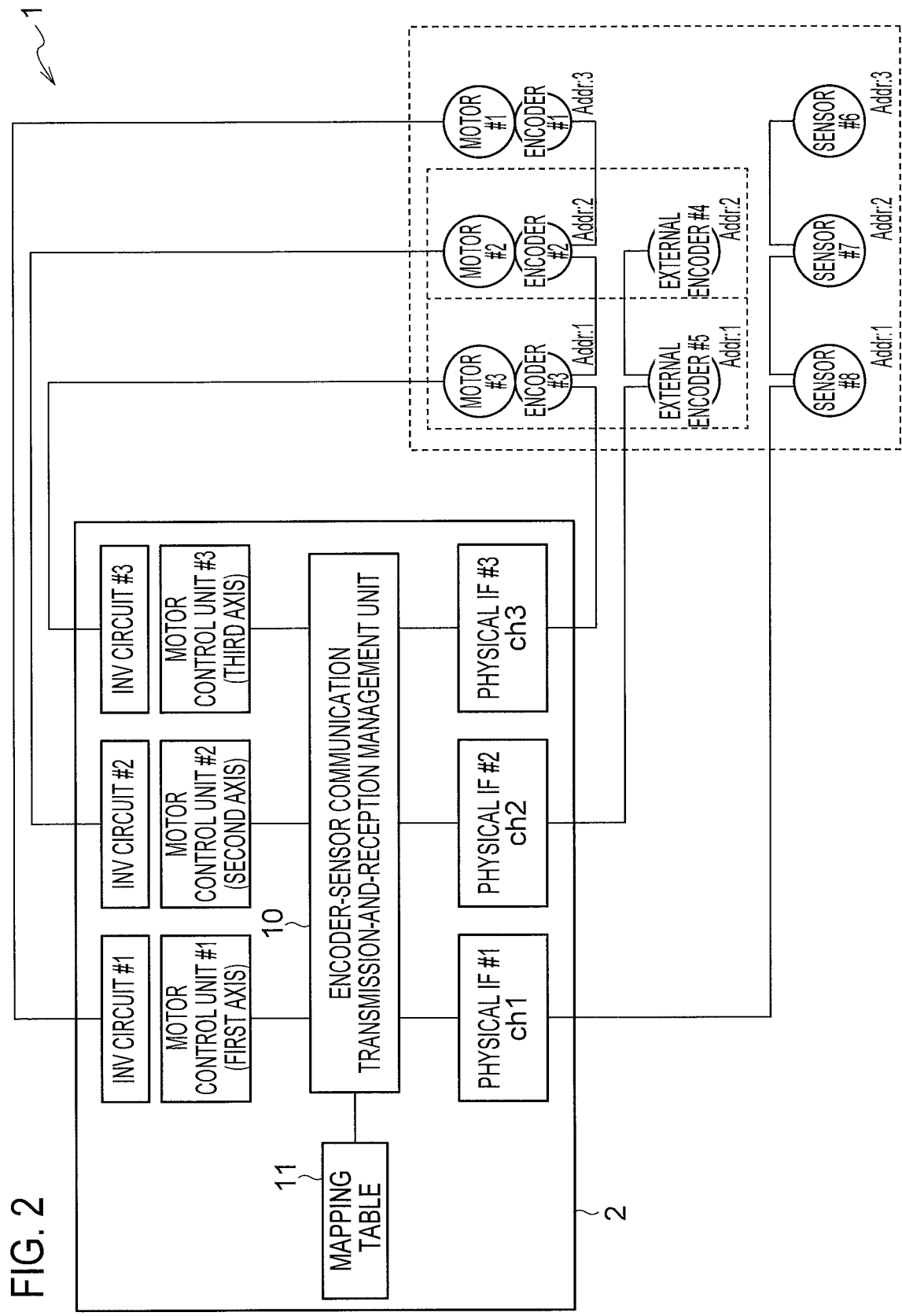
FIG. 2 is a schematic diagram illustrating an example of an overall configuration of the motor control system according to the embodiment.

In the present disclosure, the motor control system 1 according to the embodiment is configured to control a plurality of motors #1 to #3. As illustrated in FIGS. 1 and 2, the motor control system 1 includes a motor control apparatus 2, motors #1 to #3, a mechanical apparatus (not illustrated), encoders #1 to #3 that detect position information of the motors #1 to #3, encoders #4 and #5 that detect position information of the mechanical apparatus, and sensors #6 to #8.

In the embodiment, a case where one motor control apparatus 2 that drives three axes of the motors #1 to #3 is provided is described as an example. The present disclosure can be applied to a case where a plurality of motor control apparatuses are provided, or a motor control apparatus that drives one axis and the like.

The motor control apparatus 2 is configured to control the motors #1 to #3. Specifically, the motor control apparatus 2 is a device including a computer that controls an amplifier unit that outputs a current, a voltage, and the like to the motors #1 to #3. That is, the motors #1 to #3 are configured to rotate in accordance with the voltage or the current applied from the motor control apparatus 20.

Generally, the motor control apparatus 2 that controls a servomotor is called as a servo-controller, a servo-amplifier, or the like. The motor control apparatus 2 may be a device configured to control the motor 10, for example, may be an inverter.

Specifically, as illustrated in FIG. 2, the motor control apparatus 2 includes inverter (INV) circuits #1 to #3 including amplifier units, motor control units #1 to #3 that respectively control the motors #1 to #3, an encoder-sensor communication transmission-and-reception management unit 10, a non-volatile memory 11, and physical interfaces (IFs) #1 to #3.

The amplifier unit is a power converter configured to supply a current or a voltage to the motors #1 to #3 based on a torque command from the motor control units #1 to #3, by switching (PWM control) of the inverter (INV) circuits #1 to #3.

Here, as illustrated in FIG. 3, each of the motor control units #1 to #3 includes a motor control calculation unit 101, an encoder logical-axis interface 102, an external encoder logical-axis interface 103, and a sensor logical-axis interface 104.

The motor control calculation unit 101 is configured to receive a command (position command and the like) from a host device and performs calculation for controlling positions, speeds, torques, and the like of the motors #1 to #3.

The encoder logical-axis interface 102 is configured to read out constants of the motors #1 to #3 corresponding to the motor control units #1 to #3 to which the encoder logical-axis interface 102 belongs, and identification information (encoder ID information) of the encoders #1 to #3 corresponding to the motors #1 to 43, based on a mapping table which is managed by the encoder-sensor communication transmission-and-reception management unit 10 and is stored in the non-volatile memory 11.

The encoder logical-axis interface 102 is configured to acquire position information of the motors #1 to #3 corresponding to the motor control units #1 to #3 to which the encoder logical-axis interface 102 belongs from the encoder #1 to #3 corresponding to the motors #1 to #3, based on the mapping table which is managed by the encoder-sensor communication transmission-and-reception management unit 10 and is stored in the non-volatile memory 11.

Specifically, in the embodiment, the encoder logical-axis interface 102 in the motor control unit #1 is configured to acquire the motor constant or the position information of the motor 1 and the encoder ID information of the encoder #1 from the encoder-sensor communication transmission-and-reception management unit 10.

Similarly, the encoder logical-axis interface 102 in the motor control unit #2 is configured to acquire the motor constant or the position information of the motor #2 and the encoder ID information of the encoder #2 from the encoder-sensor communication transmission-and-reception management unit 10.

Similarly, the encoder logical-axis interface 102 in the motor control unit #3 is configured to acquire the motor constant or the position information of the motor #3 and the encoder ID information of the encoder #3 from the encoder-sensor communication transmission-and-reception management unit 10.

The external encoder logical-axis interface 103 is configured to read out identification information (external encoder ID information) of the external encoders #4 and #5 corresponding to the motors #2 and #3 corresponding to the motor control units #1 to #3 to which the external encoder logical-axis interface 103 belongs, based on the mapping table which is managed by the encoder-sensor communication transmission-and-reception management unit 10 and is stored in the non-volatile memory 11.

The external encoder logical-axis interface 103 is configured to acquire the position information of the mechanical apparatus that is driven by the motors #2 and #3 corresponding to the motor control units #2 and #3 to which the external encoder logical-axis interface 103 belongs, from the external encoders #4 and #5 corresponding to the mechanical apparatus that is driven by the motors #2 and #3. The acquisition is performed based on the mapping table which is managed by the encoder-sensor communication transmission-and-reception management unit 10 and is stored in the non-volatile memory 11.

Specifically, in the embodiment, the external encoder logical-axis interface 103 in the motor control unit #2 is configured to acquire position information of the mechanical apparatus that is driven by the motor #2 or encoder ID information of the encoder #4, from the encoder-sensor communication transmission-and-reception management unit 10.

Similarly, the external encoder logical-axis interface 103 in the motor control unit #3 is configured to acquire position information of the mechanical apparatus that is driven by the motor #3 or encoder ID information of the encoder #5, from the encoder-sensor communication transmission-and-reception management unit 10.

The sensor logical-axis interface 104 is configured to read out identification information (sensor ID information) of the sensors #6 to #8 corresponding to the motor control units #1 to #3 to which the sensor logical-axis interface 104 belongs, based on the mapping table managed by the encoder-sensor communication transmission-and-reception management units 10.

The sensor logical-axis interface 104 is configured to read out sensor data of the sensors #6 to #8 corresponding to the motor control units #1 to #3 to which the sensor logical-axis interface 104 belongs, based on the mapping table managed by the encoder-sensor communication transmission-and-reception management units 10. Here, the sensor data includes ON/OFF information and the like of the sensor, for example.

The encoder-sensor communication transmission-and-reception management unit 10 is configured to manage communications with the encoders #1 to #5 or the sensors #6 to #8. Here, the encoder-sensor communication transmission-and-reception management unit 10 is configured to manage the mapping table illustrated in FIG. 4.

The mapping table is configured to be stored in a non-volatile memory such as an electrically erasable programmable read only memory (EEPROM).

In the example of a first axis in FIG. 4, the identification information of the encoder #1 and the motor control unit #1 (motor #1) are associated with each other. Specifically, the encoder logical-axis interface 102 of the motor control unit #1, the physical interface #3 (ch3), a communication address Addr.3, and the identification information of the encoder #1 are associated with each other.

Similarly, in the example of the first axis in FIG. 4, the identification information of the sensor #6 and the motor control unit #1 (motor #1) are associated with each other. Specifically, the sensor logical-axis interface 104 of the motor control unit #1, a physical interface #1 (ch1), the communication address Addr.3, and the identification information of the sensor #6 are associated with each other.

In the example of the first axis in FIG. 4, the external encoder is not provided. Thus, identification information of the external encoder and the motor control unit #1 (motor #1) are not associated with each other.

In the example of a second axis in FIG. 4, the identification information of the encoder #2 and the motor control unit #2 (motor #2) are associated with each other. Specifically, the encoder logical-axis interface 102 of the motor control unit #2, the physical interface #3 (ch3), a communication address Addr.2, and the identification information of the encoder #2 are associated with each other.

Similarly, in the example of the second axis in FIG. 4, the identification information of the encoder #4 (external encoder) and the motor control unit #2 (motor #2) are associated with each other. Specifically, the external encoder logical-axis interface 103 of the motor control unit #2, a physical interface #2 (ch2), the communication address Addr.2, and the identification information of the encoder #4 are associated with each other.

Similarly, in the example of the second axis in FIG. 4, the identification information of the sensor #7 and the motor control unit #2 (motor #2) are associated with each other. Specifically, the sensor logical-axis interface 104 of the motor control unit #2, the physical interface #1 (ch1), the communication address Addr.2, and the identification information of the sensor #7 are associated with each other.

In the example of a third axis in FIG. 4, the identification information of the encoder #3 and the motor control unit #3 (motor #3) are associated with each other. Specifically, the encoder logical-axis interface 102 of the motor control unit #3, the physical interface #3 (ch3), the communication address Addr.1, and the identification information of the encoder #3 are associated with each other.

Similarly, in the example of the third axis in FIG. 4, the identification information of the encoder #5 (external encoder) and the motor control unit #3 (motor #3) are associated with each other. Specifically, the external encoder logical-axis interface 103 of the motor control unit #3, the physical interface #2 (ch2), the communication address Addr.1, and the identification information of the encoder #5 are associated with each other.

Similarly, in the example of the third axis in FIG. 4, the identification information of the sensor #8 and the motor control unit #3 (motor #3) are associated with each other. Specifically, the sensor logical-axis interface 104 of the motor control unit #3, the physical interface #1 (ch1), communication address Addr.1, and the identification information of the sensor #8 are associated with each other.

The mapping table may be set in advance by a user, and the setting details may be preserved in the non-volatile memory 11 of the motor control apparatus 2.

For example, the encoder-sensor communication transmission-and-reception management unit 10 is configured to assign unique communication addresses to the encoders #1 to #3, the external encoders #4 and #5, and the sensors 46 to #8 based on the above-described mapping table.

The encoder-sensor communication transmission-and-reception management unit 10 is configured to transfer the constants of the motors #1 to #3, the identification information of the encoders #1 to #3, the identification information of the external encoders #4 and #5, and the identification information of the sensors #6 to #8 to the corresponding encoder logical-axis interface 102, the corresponding external encoder logical-axis interface 103, or the corresponding sensor logical-axis interface 104, based on the above-described mapping table.

Similarly, the encoder-sensor communication transmission-and-reception management unit 10 is configured to transfer the position information of the motors #1 to #3, the position information of the mechanical apparatus that is driven by the motors #2 and #3, and the sensor data of the sensors #6 to #8 to the corresponding encoder logical-axis interface 102, the corresponding external encoder logical-axis interface 103, or the corresponding sensor logical-axis interface 104, based on the above-described mapping table.

The physical interfaces #1 to #3 are configured to perform processing of transmitting and receiving data to and from devices (motor control apparatus, encoder, external encoder, sensor, and the like) other than the motor control apparatus 2 to which the physical interfaces #1 to #3 belong.

Here, the encoders #1 to #3 and the external encoders #4 and #5 may be optical encoders or magnetic encoders, for example. The encoders #1 to #3 and the external encoders #4 and #5 are configured to transmit the position information of the motors #1 to #3 or the position information of the mechanical apparatus that is driven by the motor #2 or #3, to the motor control apparatus 2.

In the embodiment, a case using the encoders #1 to #3 and the external encoders #4 and #5 as the position detector is described as an example. The present disclosure can be applied to a case using a sensor (for example, resolver) capable of detecting the position information of the motors #1 to #3 and the position information of the mechanical apparatus that is driven by the motors #2 and #3. Here, the encoders #1 to #3 and the external encoders #4 and #5 may be linear scales (linear encoders) used in a case where the motors #1 to #3 are linear motors or linear scales (linear encoders) attached to the mechanical apparatus.

The motors #1 to #3 may be rotary motors or linear motors. Here, in a case where the motors #1 to #3 are rotary motors, the above-described position information indicates a rotation angle. In a case where the motors #1 to #3 are linear motors, the above-described position information indicates a linear position.

In the embodiment, a case where the encoders #1 to #3 and the external encoders #4 and #5 are provided is described as an example. The present disclosure can be applied to a case where there is no limitation to the number of external encoders (for example, 0, 1, or three or more).

The mechanical apparatus is configured to be driven by the motors #1 to #3. For example, a robot corresponds to the mechanical apparatus. For example, in the embodiment, the motors #1 to #3 are configured to respectively drive the first axis to the third axis of a three-axis robot as the mechanical apparatus.

The sensors #6 to #8 are configured to detect information (sensor data) relating to at least any one of the motors #1 to #3 and the mechanical apparatus configured to be driven by the motors #1 to 3. For example, a temperature sensor, a pressure sensor, a torque sensor, a vibration sensor, a limit switch sensor, a touch sensor, and an I/O device are assumed as the plurality of sensors #6 to #8.

The temperature sensor is a sensor configured to detect the temperature of at least any one of the mechanical apparatus and the motors #1 to #3 or the temperature in the vicinity of the mechanical apparatus or the motors #1 to #3. For example, a temperature measuring resistor type sensor or a thermocouple type sensor may be used as the temperature sensor.

The pressure sensor is a sensor configured to detect the pressure of at least any one of the mechanical apparatus and the motors #1 to #3 or the pressure in the vicinity of the mechanical apparatus or the motors #1 to #3. The pressure sensor is configured to measure the pressure with a pressure-sensitive element through a diaphragm (a stainless steel diaphragm, a silicon diaphragm, or the like) and to convert the measured pressure into an electrical signal and output the electrical signal.

The torque sensor is a sensor configured to detect a torque of at least any one of the mechanical apparatus and the motors #1 to #3. For example, the torque sensor may be a non-contact type torque sensor or a contact type torque sensor.

The information (sensor data) relating to at least any one of the mechanical apparatus and the motors #1 to #3 means information which is not position information of the motors #1 to #3 among types of information regarding the state of at least any one of the mechanical apparatus and the motors #1 to #3. The information relating to at least any one of the mechanical apparatus and the motors #1 to #3 may be, for example, information which can be detected by the sensors #6 to #8.

For example, the information relating to at least any one of the mechanical apparatus and the motors #1 to #3 is information of the torques of the motors #1 to #3, the temperatures of the motors #1 to #3, a position of an object such as an arm, which is moved by the motors #1 to #3, pressure on the object, or the state (for example, temperature or ON/OFF information) of the sensors #6 to #8 that detect the above items.

The association information regarding at least any one of the mechanical apparatus and the motors #1 to #3 is used for an output control of the motors #1 to #3 or for adjusting a control parameter or is used for determining whether or not a problem occurs in the motors #1 to #3 or predicting lifespans (remaining periods) of the motors #1 to #3.

Here, as illustrated in FIG. 2, in the motor control system 1 according to the embodiment, the encoders #1 to #3, the external encoders #4 and #5, and the sensors #6 to #8 are connected under a control of the motor control apparatus 2.

Specifically, in the motor control system 1 according to the embodiment, as illustrated in FIG. 1, the encoder #1 and the sensor #6 are connected in series under a control of the first axis of the motor control apparatus 2.

Similarly, in the motor control system 1 according to the embodiment, as illustrated in FIG. 1, the encoder #2, the external encoder #4, and the sensor #7 are connected in series under a control of the second axis of the motor control apparatus 2.

Further, in the motor control system 1 according to the embodiment, as illustrated in FIG. 1, the encoder #3, the external encoder #5, and the sensor #8 are connected in series under a control of the third axis of the motor control apparatus 2.

In the embodiment, a case where the three sensors 6 to #8 are provided is described as an example. The present disclosure can be applied to a case where any sensor is not provided, a case where two sensors or less are provided, a case where four sensors or more are provided, and the like.

Here, the motor control apparatus 2 is configured to automatically acquire the identification information of the encoders #1 to #3, the identification information of the external encoders #4 and #5, and the identification information of the sensors #6 to #8 and to store the identification information and the motor control units #1 to #3 in the non-volatile memory 11 in association with each other.

Specifically, the encoder-sensor communication transmission-and-reception management unit 10 in the motor control apparatus 2 is configured to automatically acquire the identification information of the sensors #6 to #8 through the physical interface #1 and to store the identification information and the motor control units #1 to #3 in the non-volatile memory 11 in association with each other.

Similarly, the encoder-sensor communication transmission-and-reception management unit 10 in the motor control apparatus 2 is configured to automatically acquire the identification information of the encoders #4 and #5 through the physical interface #2 and to store the identification information and the motor control units #2 and #3 in the non-volatile memory 11 in association with each other.

Similarly, the encoder-sensor communication transmission-and-reception management unit 10 in the motor control apparatus 2 is configured to automatically acquire the identification information of the encoders #1 to #3 through the physical interface #3 and to store the identification information and the motor control units #1 to #3 in the non-volatile memory 11 in association with each other.

The motor control apparatus 2 may be configured to compare the identification information of the encoders #1 to #3, the identification information of the external encoders #4 and #5, or the identification information of the sensors #6 to #8, which have been acquired from the encoders #1 to #3, the external encoders #4 and #5, and the sensors #6 to #8 connected under the control of the motor control apparatus 2, to the identification information of the encoders #1 to #3, the identification information of the external encoders #4 and #5, or the identification information of the sensors 6 to #8, which have been stored in the non-volatile memory 11. Thus, the motor control apparatus 2 may be configured to check at least one of whether the encoders #1 to #3, the external encoders #4 and #5, and the sensors #6 to #8 operate as the above-described association and whether a connection configuration of the encoders #1 to #3, the external encoders #4 and 5, and the sensors #6 to #8 is not changed.

Further, the motor control apparatus 2 may be configured to instruct the encoders #1 to #3, the external encoders #4 and #5, or the sensors #6 to #8 to perform setting. For example, the motor control apparatus 2 is configured to instruct the encoders #1 to #3 and the external encoders #4 and #5 to set an origin, set a multiturn limit, reset a multiturn, and the like.

Here, the origin is a zero point in a coordinate system of the mechanical apparatus that is driven by the motors #1 to #3. For example, origin setting means that the origin is set to any position by a predetermined parameter in a case where an absolute linear encoder is used as the position detector. The user of the motor control apparatus 2 can set the predetermined parameter to be any value in accordance with the used mechanical apparatus.

The multiturn limit is used, for example, for controlling the position of a rotating body such as a turntable by using an absolute encoder as the position detector. In a case where a mechanical apparatus that moves the turntable only in one direction is assumed, the turntable rotates only in the one direction. Thus, the number of rotations of the turntable may exceed the upper limit of the number of rotations that can be counted by the absolute encoder. The multiturn limit is a parameter used such that fractions do not occur in an integer ratio relationship of the number of rotations of the motor and the number of rotations of the turntable, in this case. The user of the motor control apparatus 2 can set the parameter to any value in accordance with the mechanical apparatus to be used.

The multiturn reset means initialization (initialization of multiturn data) of the absolute value encoder to be used.

The motor control apparatus 2 is configured to start the motor control apparatus 20 again in a case where the above-described setting is performed and to check at least one of whether or not the encoders #1 to #3, the external encoders #4 and #5, or the sensors #6 to #8 operate as with the setting and whether or not predetermined operations of the motors #1 to #3 controlled by the motor control apparatus 2 are possible.

The motor control apparatus 2 may be configured to check at least one of whether or not the encoders #1 to #3, the external encoders #4 and #5, or the sensors #6 to #8 operate as with the setting and whether or not predetermined operations of the motors #1 to #8 controlled by the motor control apparatus 2 are possible, in a case where the power of the motor control apparatus 2 is put again, or in a case where the motor control apparatus 2 is restored (alarm reset) from an abnormal state or changes a parameter that requires power on (that is, in a case where the motor control apparatus 2 is software-reset).

Next, an example of an operation of the motor control apparatus 2 constituting the motor control system 1 according to the embodiment will be described with reference to FIGS. 5 and 6.

Figure 5:
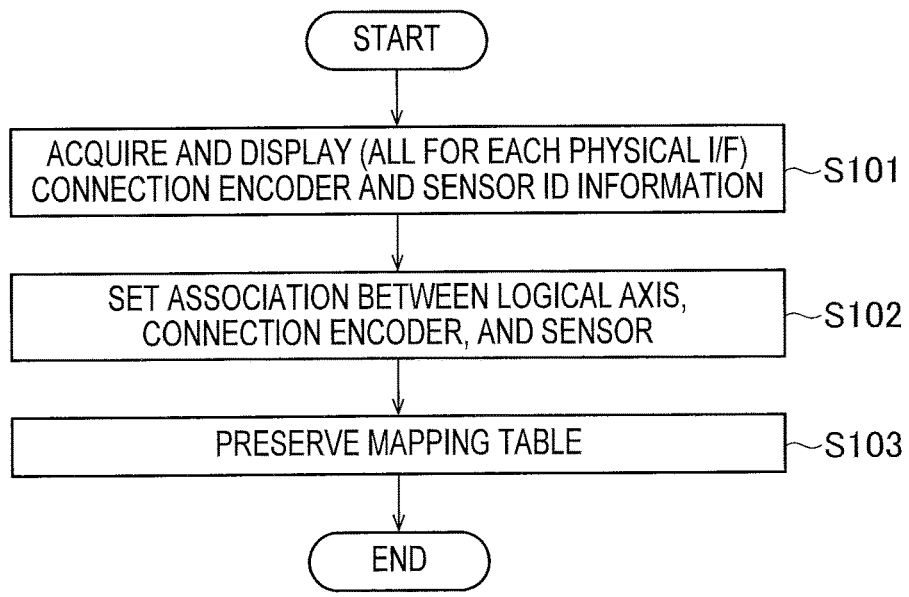
FIG. 5 is a diagram illustrating an operation of the motor control apparatus constituting the motor control system according to the embodiment.

As illustrated in FIG. 5, in Step S101, the motor control apparatus 2 automatically acquires and displays the identification information of the encoders #1 to #3, the identification information of the external encoders #4 and #5, and the identification information of the sensors #6 to #8, through the physical interfaces #1 to #3.

In Step S102, the motor control apparatus 2 sets association between the identification information and the logical-axis interfaces 102 to 104. In Step S103, the motor control apparatus 2 generates the mapping table (see FIG. 4) and stores the mapping table in the non-volatile memory 11.

Figure 6:
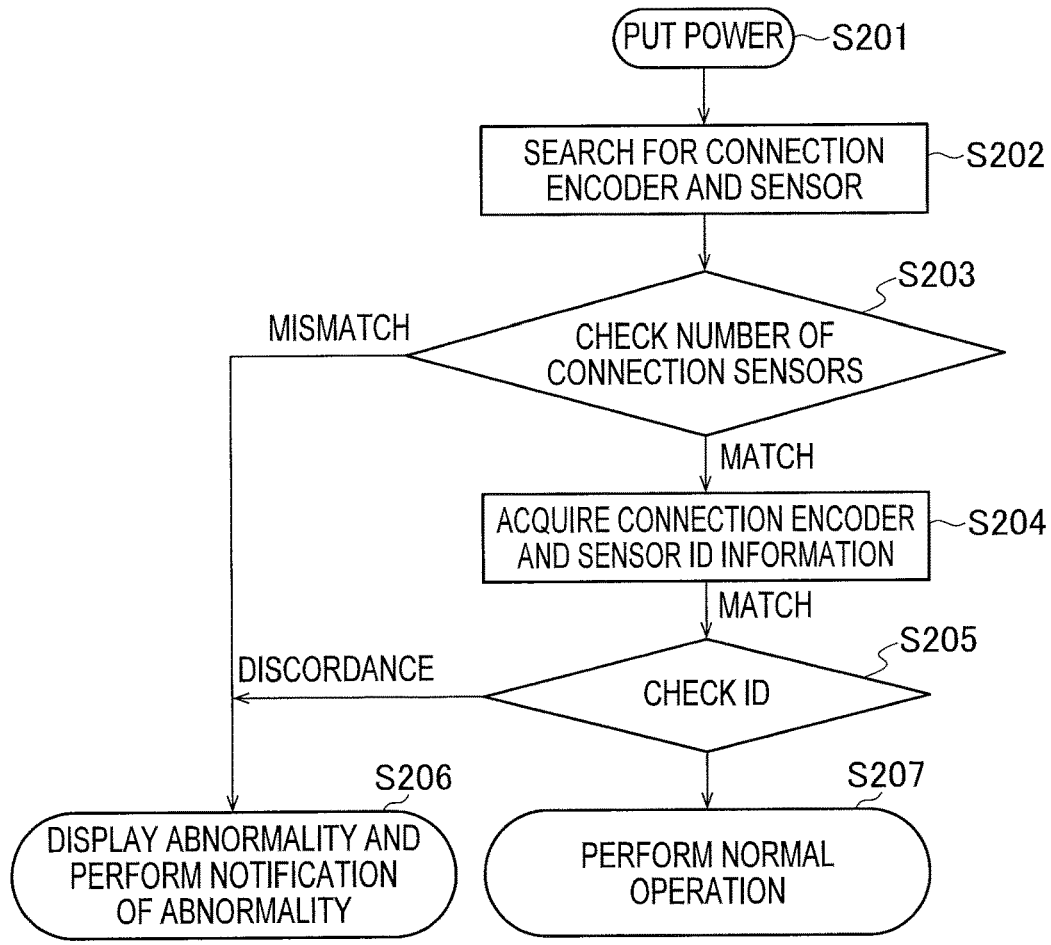
FIG. 6 is a diagram illustrating an operation of the motor control apparatus constituting the motor control system according to the embodiment.

As illustrated in FIG. 6, if the power is put into the motor control apparatus 2 in Step S201, the motor control apparatus 2 automatically searches for the encoders #1 to #3, the external encoders #4 and #5, and the sensors #6 to #8 connected under the control of the physical interfaces #1 to #3 of the motor control apparatus 2 in Step S202.

In Step S203, the motor control apparatus 2 compares the number of the encoders #1 to #3, the external encoders #4 and #5, and the sensors #6 to #8 connected under the control of the physical interface #1 to #3 of the motor control apparatus 2 to the managed number (number registered in the mapping table).

In a case where both the numbers are equal to each other, the process proceeds to Step S204. In a case where both the numbers are not equal to each other, the process proceeds to Step S206.

In Step S204, the motor control apparatus 2 acquires the identification information of the encoders #1 to #3, the external encoders #4 and #5, and the sensors #6 to #8 connected under the control of the physical interface #1 to #3 of the motor control apparatus 2.

In Step S205, the motor control apparatus 2 compares the acquired identification information to the managed identification information (identification information registered in the mapping table).

In a case where both pieces of identification information coincide with each other, the process proceeds to Step S207. In a case where both the pieces of identification information do not coincide with each other, the process proceeds to Step S206.

In Step S206, the motor control apparatus 2 displays abnormality and performs a notification of the abnormality. In Step S207, the motor control apparatus 2 performs a normal operation.

According to the motor control system 1 in the embodiment, even in a case where the plurality of encoders and one or the plurality of sensors are configured to be connected in series under the control of the motor control apparatus 2, it is possible to appropriately realize the setting procedure of the motor control apparatus 2. As a result, it is possible to reduce a physical or processing cost.

REFERENCE SIGNS LIST

1 . . . motor control system
2 . . . motor control apparatus
10 . . . encoder-sensor communication transmission-and-reception management unit
11 . . . non-volatile memory
101 . . . motor control calculation unit
102 . . . encoder logical-axis interface
103 . . . external encoder logical-axis interface
104 . . . sensor logical-axis interface

The invention claimed is:

1. A motor control apparatus comprising:
a plurality of motor control circuitries each of which controls a respective motor of a plurality of motors;
a circuitry configured to automatically acquire identification information of each of a plurality of position detectors for each respective motor under a control of the motor control apparatus and which are configured to detect position information of the respective motor or position information of a mechanical apparatus to be driven by the respective motor;
a non-volatile memory in which the identification information is stored in association with each of the motor control circuitries; and
each of the plurality of position detectors comprising:
a first position detector to detect the position information of the respective motor; and
an external position detector to detect the position information of the mechanical apparatus, the first position detector and the external position detector being connected in series.

2. The motor control apparatus according to claim 1, wherein the circuitry is configured to
compare the identification information of the plurality of position detectors which has been acquired from the plurality of position detectors to the identification information of the plurality of position detectors which has been stored in the non-volatile memory, and
determine whether the position detectors operate in association with the motor control circuitries and/or whether a connection configuration of the plurality of position detectors is not changed.

3. A motor control apparatus comprising:
a plurality of motor control circuitries each of which controls a respective motor of a plurality of motors;
a circuitry configured to automatically acquire identification information of each of a respective position detector and a respective sensor for each respective motor under a control of the motor control apparatus, the respective sensor being directly connected to the respective position sensor in series;
a non-volatile memory in which the identification information is stored in association with each of the motor control circuitries;
the respective position detector configured to detect position information of the respective motor or position information of a mechanical apparatus to be driven by the respective motor; and
the respective sensor configured to detect first information relating to at least one of the respective motor and the mechanical apparatus configured to be driven by the respective motor, the first information being other than the position information of the respective motor.

4. The motor control apparatus according to claim 3, wherein
the circuitry is configured to
compare the identification information of the respective position detector and identification information of the respective sensor which have been acquired from the respective position detector and the respective sensor, respectively, to identification information of the respective position detector and the identification information of the respective sensor which have been stored in the non-volatile memory, and
determine whether the respective position detector and the respective sensor operate in association with the motor control circuitries and/or whether a connection configuration of the respective position detector and the respective sensor is not changed.

5. A motor control method comprising:
automatically acquiring identification information of each of a plurality of position detectors under a control of the motor control apparatus and to detect position information of a motor or position information of a mechanical apparatus to be driven by the motor, each of the plurality of position detectors comprising:
a first position detector to detect the position information of the motor; and
an external position detector to detect the position information of the mechanical apparatus, the first position detector and the external position detector being connected in series; and
storing the acquired identification information in a non-volatile memory in association with the motor.

6. A motor control method comprising:
automatically acquiring identification information of a position detector configured to detect position information of the motor or position information of a mechanical apparatus configured to be driven by the motor;
automatically acquiring identification information of a sensor which is directly connected to the position sensor in series under a control of a motor control apparatus and which is configured to detect first information relating to at least one of the mechanical apparatus and the motor, the first information being other than the position information of the motor, the position detector and the sensor being connected in series; and
storing the acquired identification information and the motor in a non-volatile memory in association with each other, by the motor control apparatus.

7. A motor control system comprising:
a motor control apparatus including a plurality of motor control circuitries each of which controls a respective motor of a plurality of motors;
a plurality of position detectors for each respective motor under a control of the motor control apparatus and configured to detect position information of the respective motor or position information of a mechanical apparatus configured to be driven by the respective motor;
the motor control apparatus configured to automatically acquire identification information of each of the plurality of position detectors and to store the identification information in the non-volatile memory in association with the motor control circuitries; and
each of the plurality of position detectors comprising:

a first position detector to detect the position information of the respective motor; and
an external position detector to detect the position information of the mechanical apparatus, the first position detector and the external position detector being connected in series.

8. A motor control system comprising:
a motor control apparatus including a plurality of motor control circuitries each of which controls a respective motor of a plurality of motors corresponding to the motor control circuitries;
a mechanical apparatus configured to be driven by the respective motor;
a position detector configured to detect position information of the respective motor or position information of the mechanical apparatus;
a sensor configured to detect first information relating to at least one of the mechanical apparatus and the respective motor, the first information being other than the position information of the respective motor; and
the motor control apparatus comprising:
a circuitry configured to
automatically acquire identification information of the position detector and identification information of the sensor, the position detector and the sensor being directly connected in series under a control of the motor control apparatus; and
store the identification information and the motor control circuitries in a non-volatile memory in association with the motor control circuitries.

9. The motor control apparatus according to claim 3, wherein the first information includes at least one of:
a temperature of at least one of the respective motor or the mechanical apparatus;
a pressure of at least one of the respective motor or the mechanical apparatus;
a torque of at least one of the respective motor or the mechanical apparatus; or
a vibration of at least one of the respective motor or the mechanical apparatus.

10. The motor control method according to claim 6, wherein the first information includes at least one of:
a temperature of at least one of the respective motor or the mechanical apparatus;
a pressure of at least one of the respective motor or the mechanical apparatus;
a torque of at least one of the respective motor or the mechanical apparatus; or
a vibration of at least one of the respective motor or the mechanical apparatus.

11. The motor control system according to claim 8, wherein the first information includes at least one of:
a temperature of at least one of the respective motor or the mechanical apparatus;
a pressure of at least one of the respective motor or the mechanical apparatus;
a torque of at least one of the respective motor or the mechanical apparatus; or
a vibration of at least one of the respective motor or the mechanical apparatus.

12. A motor control apparatus comprising:
a first motor control circuitry configured to controls a first motor;
a first plurality of position detectors that are connected to each other in series and to the first motor control circuitry, the first plurality of position detectors being configured to detect position information of the first motor or position information of a mechanical apparatus to be driven by the first motor;
a second motor control circuitry configured to controls a second motor;
a second plurality of position detectors that are connected to each other in series and to the second motor control circuitry, the second plurality of position detectors being configured to detect position information of the second motor or position information of the mechanical apparatus to be driven by the second motor;
a circuitry configured to automatically acquire identification information of each of the first plurality of position detectors and each of the second plurality of position detectors;
a non-volatile memory in which the identification information is stored in association with the first motor control circuitry and the second motor control circuitry; and
the second plurality of position detectors comprising:
a first position detector to detect the position information of the second motor; and
an external position detector to detect the position information of the mechanical apparatus, the first position detector and the external position detector being connected in series.

* * * * *